Feb. 6, 1968     J. R. BAUGHMAN ET AL     3,367,141
ROTARY SHAFT COUPLING
Filed Sept. 21, 1965
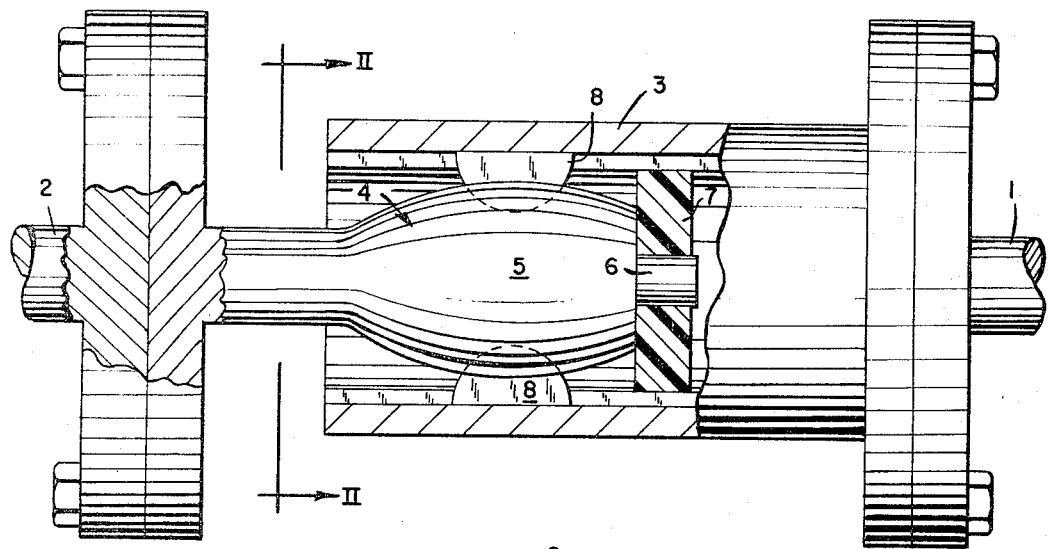
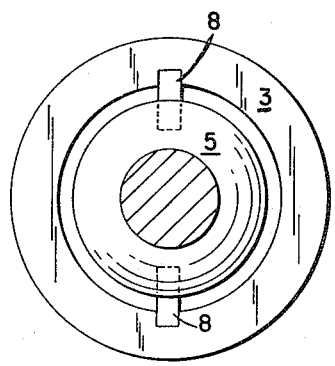
*INVENTORS.*
JAMES R. BAUGHMAN.
ANDREW PAPINCHAK.
BY
ATTORNEY.

3,367,141
ROTARY SHAFT COUPLING
James R. Baughman, Canoga Park, Calif., and Andrew Papinchak, Jeannette, Pa., assignors to Carrier Corporation, Syracuse, N.Y., a corporation of Delaware
Filed Sept. 21, 1965, Ser. No. 489,003
1 Claim. (Cl. 64—23)

ABSTRACT OF THE DISCLOSURE

A shaft coupling employing a flexible quill shaft having an enlarged portion near one end thereof for engagement with the inside of a tubular sleeve member by means of keys inserted in slots formed in the enlarged portion of the flexible quill shaft and the inner surface of the tubular sleeve, said quill shaft and tubular sleeve engaging driving and driven shafts. A washer having self-lubricating properties is affixed to the flexible quill shaft for centering the quill shaft in the tubular sleeve.

---

This invention relates broadly to coupling devices. More particularly this invention relates to a coupling for connecting approximately aligned shafts, one serving as a driver shaft and the other serving as a driven shaft. Still more particularly, this invention relates to a high speed shaft coupling employing a non-metallic centering device.

Couplings for transmitting high speed shaft rotation in the order of 30,000 r.p.m. from a driver shaft to a driven shaft have a short useful life due to surface fretting of mating parts, are quite complicated, and must be continuously lubricated.

The chief object of this invention is to provide a coupling device suitable for high speed applications having improved wear characteristics.

Another object of this invention is to provide a shaft coupling employing a flexible quill shaft to compensate for misalignment of the shafts to be coupled.

A further object of this invention is to provide a shaft coupling employing a non-metallic centering device, having self-lubricating properties, to center the flexible quill shaft within the coupling.

The objects of this invention are obtained by providing a high speed shaft coupling for operably connecting two shafts comprising a sleeve for engaging a first shaft and a quill shaft for engagement with a second shaft. The quill shaft and tubular sleeve are sized to allow the quill shaft to be displaced within the tubular sleeve. A non-metallic washer is fitted on the quill shaft to center the quill shaft in the shaft sleeve. The quill shaft and shaft sleeve are keyed together to provide a driving connection therebetween.

Other features and objects of this invention will be apparent from a consideration of the ensuing specification and drawings in which:

FIGURE 1 is a view in elevation with parts in section illustrating the improved shaft coupling forming the subject of this invention; and FIGURE 2 is a sectional view of the coupling taken along line II—II of FIGURE 1.

Referring more particularly to the drawing for an illustration of a preferred embodiment of the invention, there is shown a shaft coupling for transmitting motion between a first shaft 1 and a second shaft 2 comprising a tubular sleeve 3 and a quill shaft 4 suitably attached to shafts 1 and 2 through mounting hubs and flanges as shown. The flexible quill shaft 4, which is displaced within tubular sleeve 3 has an enlarged portion 5 thereon. The diameter of the enlarged portion 5 is slightly smaller than the inner diameter of tubular sleeve 3. Quill shaft 4 also has a small diameter portion 6 on the end thereof. A washer 7 of nylon, Teflon or other non-metallic material having self-lubricating properties is fastened on the small diameter portion 6 of quill shaft 4 by bonding or other suitable means. The fit between the washer 7 and the tubular sleeve 3 is .0002 to .0005 loose. The washer 7 is larger than the enlarged portion 5 of quill shaft 4 by .003 to .005. The tubular sleeve 3 and the enlarged portion 5 of quill shaft 4 each have two axial grooves therein spaced 180° apart to receive semicircular keys 8 which transmit rotary motion between the quill shaft 4 and the tubular sleeve 3 but allow relative axial movement between the quill shaft and the tubular sleeve.

Considering the operation of the coupling when the quill shaft 4 is connected to the driving shaft 2 and the tubular sleeve 3 is connected to the driven shaft 1, rotary motion is transmitted between quill shaft 4 and tubular sleeve 3 by semicircular keys 8. The flexible quill shaft 4 and the fit of the semicircular keys permit a small amount of misalignment in the over-all coupling. The non-metallic washer 7 centers the quill shaft 4 in the tubular sleeve 3 and permits relative motion between the quill shaft 4 and the tubular sleeve 3. The self-lubricating properties of the washer 7 prevent surface fretting of the portions of the coupling in contact with each other.

While we have described a preferred embodiment of the invention, it will be understood the invention is not limited thereto since it may be otherwise embodied within the scope of the following claim.

We claim:
1. A coupling for connecting a first shaft to a second shaft to transmit rotational movement of the first shaft to the second shaft, said coupling comprising,
a tubular sleeve for engagement with the first shaft, said sleeve having two axial grooves formed 180° apart in the inner cylindrical wall thereof capable of receiving keys therein,
a flexible quill shaft for engagement with the second shaft, said quill shaft having an enlarged rounded portion near the end thereof having two axial grooves 180° apart formed therein, said quill shaft having a small diameter section on the end thereof, said enlarged portion and said small diameter portion of said quill shaft being disposed within said tubular sleeve,
a self-lubricating washer mounted on said small diameter section of said quill shaft, said washer having an outside diameter dimensioned to engage the inside diameter of said tubular sleeve so as to concentrically position said quill shaft in said tubular sleeve,
two keys having a semi-circular configuration, the curved surfaces thereof being adapted for mating engagement with the axial grooves in the enlarged rounded portion of said quill shaft, the flat surfaces of the keys being adapted for mating engagement with the grooves in said tubular sleeve, said keys and said washer maintaining the quill shaft substantially centered in said sleeve while providing for misalignment therebetween.

References Cited

UNITED STATES PATENTS

| | | | |
|---|---|---|---|
| 1,362,652 | 12/1920 | Tucker | 64—8 |
| 1,634,499 | 7/1927 | Holdsworth | 64—9 |
| 1,827,129 | 10/1931 | Williams | 64—23 |
| 2,650,484 | 9/1953 | Bujak | 64—23 |
| 2,675,283 | 4/1954 | Thomson | 308 |
| 2,906,108 | 9/1957 | McCann | 64—23 |
| 2,978,885 | 4/1961 | Davison | 64—1 |
| 2,982,117 | 5/1961 | Erpenstein | 64—9 |
| 3,279,216 | 10/1966 | Spaulding | 64—23 |

HALL C. COE, *Primary Examiner.*